United States Patent Office 3,151,095
Patented Sept. 29, 1964

3,151,095
PROCESS OF MIXING GLASS FLAKES WITH A NORMALLY LIQUID RESIN IN FROZEN, COMMINUTED FORM
Jack T. Stone, Lemon Grove, and Albert J. Luirette, El Cajon, Calif., assignors to Whittaker Corporation, a corporation of California
No Drawing. Filed Jan. 13, 1961, Ser. No. 82,382
16 Claims. (Cl. 260—37)

This invention relates to flake reinforced plastic composite molding compounds and to the method of their composition.

In recent years reinforced resinous plastics have come into very wide commercial use for a number of applications including structural materials. In such plastics, the reinforcing members have commonly been fibers which have been woven to form a fabric or simply formed into a mat. Layers of this fabric or mat are laminated with a suitable resin binder and the composite is then cured, for example, by heat and pressure to form the final product. Such fiber-reinforced laminates, because of their high strength, relatively low cost, and resistance to corrosion are particularly suitable for and have been extensively used for structural materials such as aircraft skins, automobile bodies, boat hulls and the like. These materials, however, have certain limitations and are difficult to fabricate into structural members other than those of simple form and shape. These limitations and difficulties generally stem from the use of fibers as the reinforcing members. Moreover, in order to produce a satisfactory glass fiber laminate, care must be employed in the fabrication, handling and treatment of the fibers which substantially increases costs. Finally, the fibers used must have certain rather critical dimensions, must be protected from abrasion damage, and normally must be given a particular surface treatment.

Extensive efforts have been and are being expended to increase fiber strengths, to develop higher modulus fibers, to develop higher temperature fibers, to develop new and better surface treatments, and to more accurately control the various processing variables in the manufacture of the fibers.

In addition to the above, the use of fibers as the reinforcing members presents other difficulties. Thus, the open mesh nature of the woven fibers provides paths through the structure with the result that it is not impervious to penetration by certain liquids and volatiles. This not only renders the material more subject to oxidation but also is undesirable for a number of applications as, for example, where the material is being used as an anticorrosion coating or a moisture barrier. The characteristics of the woven fibers make difficult the fabrication of many articles from the composite since the material does not readily lend itself to molding articles of intricate or complex configurations. Nonuniformity of the composite material in the form of resin rich or resin starved areas caused by overlaps, wrinkles, bridging, bulky joints, etc. of the reinforcing fabric reduces the strength of the finished product.

One solution which has been proposed to overcome certain of the limitations of composite fabric reinforced laminates and particularly the problem of constructing articles of intricate or complex configurations is to form a molding compound utilizing a composite of a resin with randomly disposed short-length or chopped glass fibers as the reinforcing members. While such a compound has met with some commercial success, it has certain inherent disadvantages which seriously limit its field of application. Thus, in order that the compound be sufficiently flowable to fill a mold having even moderately complex configurations, only a limited amount of glass fiber reinforcement can be employed. The allowable limits are on the order of 30% glass by weight. Attempts to increase the amount of glass result in marked and unacceptable nonuniform flow of the compound in the mold with resultant nonuniform dispersion of glass through the final article. This required low glass content of the composite results in markedly lower strength characteristics of the final product than is achieved in the fiber glass laminates wherein a substantially higher glass to resin ratio exists. In addition, such materials possess each of the several disadvantages above noted resulting from the use of fibers as the reinforcing elements.

While, as a result of extensive research and experimentation the above difficulties have been reduced, they are inherent in the use of fiber reinforcing members and necessarily impose limitations upon fiber glass laminates and upon the applications to which such laminates may be put.

In order to completely eliminate or very substantially reduce each of the above noted limitations of reinforcing plastic composite materials, it has been proposed to utilize flakes rather than fibers as the reinforcing material. Thus, it has been suggested that by employing exceedingly thin flat glass flakes which are aligned substantially parallel to each other in the resin binder, structural materials can be formed which will possess very marked advantages over the fiber glass plastic composite materials.

Thus, in Susman et al. application Serial No. 828,074, filed July 20, 1959, now abandoned, the use of glass flake in combination with a dry powdered uncured fusible resin to form a flaked reinforced composite plastic structural material has been taught. The composite materials of Susman et al. have met with marked commercial success. However, as shown in that application the molding compounds are limited to the use of resins which may be powdered at ambient or room temperatures. Attempts to use fusible resins which are liquid at ambient temperatures have failed from a practical point of view because of the inability of previous techniques to achieve uniform coating of the individual glass flakes.

It is accordingly an object of the present invention to provide a flake reinforced plastic molding compound utilizing resins which are not sufficiently viscous at room temperature to be ground into a non-caking powder.

It is a further object of this invention to provide methods whereby the said plastic molding compound can be produced readily and inexpensively.

It is a further object of this invention to provide such a molding compound and methods of making and forming the same wherein glass flake may be substantially uniformly coated with a liquid or semi-liquid resin.

These and other advantages of the present invention will be readily apparent, it is believed, from the following detailed description of preferred embodiments thereof and from specific examples of the molding compound and methods of formulating the same.

Generally the molding compound of the present invention is prepared by freezing a liquid resin to obtain a fine powder, mixing the powdered material with glass flakes by mechanical agitation while maintaining the temperature at a point sufficiently low to prevent agglomeration of the resin particles and then allowing the resulting mixture to return to romm temperature. The resulting composite is a molding material which may be readily poured into any desired mold and which will, upon application of heat and pressure, form a flaked composite article possessing very marked advantages.

The glass flakes used should be of a size such that they provide structural strength to the resulting molded article. While the dimensions of such flakes are not critical, they should be such that the flakes are individually flexible while at the same time being sufficiently small such that they will form a readily flowable molding compound. For example, good results have been achieved with glass flakes, the lateral, i.e., surface dimensions of which average approximately ¼ inch within the range of approximately 1/64 inch up to approximately ½ inch and whose thickness averages around 3 microns within the range of somewhat less than 1 to somewhat over 6 microns. From this description it will be clear that the lateral dimension is significantly greater than the thickness of the flakes. Such glass flakes significantly increase the strength characteristics of the resulting molded article in addition to providing the flakes with the desired flexibility. It is understood, however, that the size of the flakes can vary over a substantial range depending upon the physical, mechanical or electrical purposes of the molding compound desired for a particular application.

Such flakes have been made by blowing thin glass bubbles which are thereafter shattered to form flakes of the desired size, or by drawing and then shattering thin walled glass tubes. The flakes resulting from the shattering may then be screened to eliminate undesirable large or fine particles.

It has been determined that any liquid resin may be combined with the glass flakes to form the molding compound. Throughout this specification and in the claims the term "liquid resin" shall mean and be limited to those uncured, fusible thermosetting monomers or partially polymerized mixtures well known in the art which are not sufficiently viscous at room temperature to be ground into a noncaking powder. A noncaking powder refers to a powder which will not agglomerate or clump at room temperature. Room temperature refers to atmospheric temperatures conventionally encountered in processing plants and for the purposes of this definition the term "room temperature" shall be taken to mean an atmospheric temperature in excess of 65° F. Examples of these resins include epoxy resins, typical examples of which are epichlorohydrin Bisphenol-A epoxies, peracetic acid epoxies and the epoxy novolaks; unsaturated polyesters in combination with free radical producing catalysts such as benzoyl peroxide or benzoin; polyurethanes; isocyanates, phenolic resins such as are obtained, for example, by reacting formaldehyde and phenol; and polymers and copolymers of styrene. The epoxy resins may be hardened with aliphatic or aromatic amides such as, for example, diethylene triamine or m-phenylene diamine, the organic acids or anhydrides such as maleic anhydride, the Lewis acids such as boron trifluoride and its complexes, and the polyamides and polysulfides.

The liquid resins may be reduced to a powder by, for example, hard freezing the resin in Dry Ice, introducing the frozen resin into a ball mill maintained at the temperature of Dry Ice, and recovering the resulting fine powders. The resulting powder may be screened to eliminate large particles by passing the powder through a 100 mesh screen.

Another method of forming the powder which has been satisfactorily employed includes the spraying of the liquid resin into a freezing bath as, for example, liquid nitrogen. The size of the spray should be adjusted so that the droplets are of the approximate size of the desired resulting powder. As the droplets hit the liquid nitrogen bath they immediately freeze and settle to the bottom where they may be collected as desired. It will be apparent that if the liquid resin selected is too viscous at room temperature to be readily sprayed it may be heated to reduce the viscosity and then sprayed into the bath.

After the resin powder has been obtained it is then mixed with the glass flakes. While the proportions are not critical and may vary in many applications, it is extremely desirable that high glass to resin ratio be used. This can be accomplished by the present invention wherein a very satisfactory product results if the resin powder is on the order of only 20% by weight of the composite.

The glass flakes and resin powder are then thoroughly mixed by simple mechanical agitation such as shaking, rolling or stirring while maintaining the temperature of the resin below its melting or softening point.

It has been determined that with many resins, cooling of the glass flake or mechanical agitation equipment is unnecessary since generally, mixing can be accomplished with sufficient rapidity so that the resin does not have time to warm to a liquid. It will be apparent, however, that when resins which have melting or softening points below approximately 0° C., the glass flake and agitating equipment should be precooled as by refrigeration.

As a result of this mixing it has been determined that the resin powders form a substantially uniform coating over the surface of the individual glass flakes. Upon bringing the temperature of the composite back to room temperature, the uniform coating of the resin is maintained. This coating not only forms the desired resin binder upon subsequent fusing but in addition imparts a highly desirable characteristic to the molding compound. Thus the resin coated flakes tend to adhere to one another with the result that the mixture clumps or agglomerates into a loosely packed composite of relatively high density which may be readily charged into a mold.

Glass flakes which are coated with a powdered resin have a relatively low density, resulting in a bulky composite which is more expensive to ship, store and handle. The closely packed, high density, uniformly liquid coated glass flakes may be more readily charged into a mold to produce a final article of practically any desired configuration.

The liquid resin composite has several distinct advantages over that disclosed in the Susman, et al. application referred to above. The liquid resin-glass flake mixture is far less bulky than that obtained using a solid resin by reason of the liquid form of the resin and thus the mixture of the present invention lends itself more readily to handling on equipment designed for conventional premixed molding compounds. Further it has been determined that the liquid resin-glass flake mixture may be compression molded at pressures significantly lower than those required for solid resin-glass flake mixtures. A composite utilizing a liquid resin has been successfully compression molded at 10 p.s.i. whereas pressures on the order of 400 p.s.i. are required for those composites utilizing solid resins. Thus, liquid resin composites may be readily adapted to vacuum bag molding techniques which would be highly impracticable utilizing the solid resins.

The final composite article may be formed from the molding compound by simply pouring the mixture into a mold of the desired configuration and applying heat and pressure to cure or fuse the resin. The cured resin polymer is thus a binder for the glass flake, causing the resulting molded compound to have remarkably high strength characteristics.

The following specific examples are given by way of illustration. In each example the reinforcing material employed was untreated composition E-glass having an average thickness of about 2–3 microns and a random average lateral dimension ranging from below 1/64" up to approximately ½".

*Example No. 1*

A wide mouth container partially filled with liquid nitrogen was placed in a solid $CO_2$-acetone cooling bath. A spray gun was then loaded with a mixture of 100 parts by weight of a bisphenol A epichlorohydrin type epoxy resin (supplied by The Dow Chemical Company and sold under the trade designation DER 332) and 8 parts by weight diethylene triamine. The gun was adjusted so as to produce a fine particled fog. The resulting mixture was then sprayed into the liquid nitrogen. After a significant amount of frozen powdered resin had collected in the container (about 150 grams), spraying was stopped and the resin separated from the nitrogen by filtering. A finely divided frozen resin remained. To 70 grams of the glass flake identified above were added 30 grams of the frozen resin and the materials were rapidly mixed together in a ball mill. It was observed that during this operation the resin remained frozen and a homogeneous mixture obtained. The composite was warmed to room temperature and the resin returned to a liquid state substantially uniformly coating the glass flakes.

Fifteen grams of the resulting composite were placed in a 1" x 4" rectangular compression mold and the resin cured for four hours at 200° F. and 15 p.s.i. The molding was then removed from the mold and examined visually to determine the degree of uniformity. The resulting molding was uniform and considered to be satisfactory.

*Example No. II*

A porcelain mortar was placed in a container packed with powdered solid carbon dioxide. After the mortar had cooled, 18 grams of a mixture of 100 parts by weight of a bisphenol A epichlorohydrin type epoxy resin (manufactured by the Shell Chemical Company and sold under the trade designation Epon 828) and 18 parts by weight of an aromatic amine type curing agent (manufactured by the Shell Chemical Company and sold under the trade designation curing agent Z) were placed in the mortar and allowed to cool. Powered $CO_2$ was then added to the mixture in the mortar and the frozen mixture was ground with a pestle. Forty-two grams of glass flake were cooled to the temperature of solid $CO_2$ in a one quart container. After cooling the frozen resin powder was added to the cooled flakes and the composite agitated for 15 minutes on a conventional paint shaker. Fifteen grams of the resulting mixture were loaded into a 1" x 4" rectangular compression mold and the mixture cured at 330° F. for one hour at 10 p.s.i. The molding was then removed from the mold and tested in flexure in accordance with the procedure specified in Federal Specification L–P–406, Method 1031. A flexural strength of 13,400 p.s.i. and a flexural modulus of $1.8 \times 10^6$ p.s.i. were observed.

*Example No. III*

One mole of 3,4-ethoxy-6-methylcyclohexane carboxylate (manufactured by Union Carbide Chemical Company and sold under the trade designation Epoxide 201) was mixed with one mole of maleic anhydride and 0.33 mole of ethylene glycol. The resulting mixture was sprayed into liquid nitrogen, as in Example I, to obtain a frozen powdered resin. The resulting powdered material, when admixed with glass flake and molded at 350° F. for 6 hours at 15 p.s.i. was uniform and considered to be satisfactory.

*Example No. IV*

The process of Example No. II was repeated using a liquid epoxy novolak and a diamino diphenyl sulfone as a curing agent. The resutling powder, when mixed with glass flake, in a ratio of 30 parts resin to 70 parts flake produced a satisfactory molding.

Other liquid resins which have been used with equal success in forming the molding compound include peracetic acid epoxy resin, unsaturated polyester resins, polyurethanes and phenolic resins. The resins were combined with suitable curing agents or accelerators to improve cross-linkage and strength of the ultimate molded product.

It will be apparent from the above that any liquid resin or mixtures thereof may be used in forming the composite molding composition, it being only necessary that the resin be cooled to the point at which it may be powdered.

While in the examples set forth above the by weight glass to resin ratio has been 7:3, it has been determined that the ratio can be varied and is not critical. However, if the ratio is too high, the strength characteristics of the molded article will decrease as the composition becomes resin starved with the result that the resin is unable to provide an adequate and uniform bond between the glass flakes. As the ratio is appreciably lowered the strength characteristics of the molded article will decrease, since these characteristics will be more and more influenced by the resin which has a lower tensile strength than the modulus of the glass.

Finally, it will be understood that the cooling media used is not critical, it only being necessary to use a material which will not react with or act as a solvent for the particular resin selected.

Having fully described our invention, it is to be understood that we do not wish to be limited to the details set forth, but our invention is of the full scope of the appended claims.

We claim:

1. A method of forming a molding composition comprising the steps of: freezing a resin which is liquid at 65° F. to obtain a fine powder and mixing the powdered resin with a plurality of glass flakes to coat the surfaces of said flakes with said resin.

2. The method of claim 1 wherein said freezing step comprises spray freezing.

3. A method of forming a molding composition comprising the steps of: freezing a resin which is liquid at 65° F. to reduce said resin to a fine powder; mixing the powdered resin with a plurality of glass flakes; and agitating the resultant mixture to coat the surfaces of the glass flakes with said resin while maintaining the temperature of the resin below its freezing point.

4. The method of claim 3 wherein said freezing step comprises spray freezing.

5. The method of claim 3 wherein said resin is a curable epoxy resin.

6. The method of forming a molding composition as claimed in claim 3 wherein the glass flakes have average lateral dimensions on the order of ¼ inch and average thickness on the order of 2–3 microns, and the by weight ratio of glass flakes to liquid resin is approximately 7:3.

7. A method of forming a molding composition comprising the steps of: cooling a resin which is liquid at 65° F. to approximately the temperature of solid $CO_2$; reducing the cooled resin to a fine powder while maintaining the temperature of the resin at approximately the temperature of solid $CO_2$; mixing the powdered resin with a plurality of glass flakes; and agitating the resulting mixture to coat the surface of the glass flakes with said resin.

8. A method of forming a molding composition comprising the steps of: solidifying a resin which is liquid at 65° F. by reducing the temperature thereof to approximately the temperature of solid $CO_2$; pulverizing the solidified resin to a fine powder while maintaining the temperature of the resin to approximately the temperature of solid $CO_2$; mixing the powdered resin with a plurality of glass flakes, said glass flakes having average lateral dimensions on the order of ¼ inch and average thickness on the order of 2–3 microns; agitating the resulting mixture to coat the surface of the glass flakes with said resin while maintaining the temperature of the resin at approximately the temperature of solid $CO_2$; and allowing the mixture to warm to room temperature.

9. The method of forming a molding composition as claimed in claim 8 wherein the by weight ratio of glass flakes to liquid resin is approximately 7:3.

10. A method of forming a molding composition comprising the steps of: spraying a resin which is liquid at 65° F. into a fluid media, said fluid media being maintained at a temperature below the freezing point of said liquid resin; separating the resulting powdered resin from said fluid media; mixing said powdered resin with a plurality of glass flakes; and agitating the resulting mixture to coat the surface of the glass flakes with the resin.

11. A method of forming a molding composition comprising the steps of: introducing a resin which is liquid at 65° F. into a fluid media, said liquid resin being in the form of a fine spray, said fluid media being maintained at a temperature below the freezing point of said liquid resin; separating resulting powdered resin from said fluid media; mixing said powdered resin with a plurality of glass flakes, said glass flakes having average lateral dimensions on the order of ¼ inch and average thickness on the order of 2–3 microns; agitating the resulting mixture to coat the surface of the glass flakes with the resin while maintaining the temperature of the resin below its freezing point; and warming the resulting mixture to room temperature.

12. The method of claim 11 wherein said resin is a curable epoxy resin.

13. The method of forming a molding composition comprising the steps of: spraying a resin which is liquid at 65° F. into liquid nitrogen to reduce said resin to a fine powder; separating the resulting powdered resin from said liquid nitrogen; mixing the powdered resin with a plurality of glass flakes, said glass flakes having average lateral dimensions on the order of ¼ inch and average thickness on the order of 2–3 microns; agitating the resulting mixture to coat the surface of the glass flakes with the resin while maintaining the temperature of the resin below its freezing point; and warming the resulting mixture to room temperature.

14. A method of forming a molding composition as claimed in claim 13 wherein the by weight ratio of glass flakes to liquid resin is approximately 7:3.

15. A method of forming a molding compound comprising the steps of: freezing a resin which is liquid at 65° F. to reduce said resin to a fine powder; mixing the powdered resin with a plurality of glass flakes; agitating the resultant mixture to coat the surfaces of the glass flakes with said powdered resin while maintaining the temperature of the resin below its freezing point; and warming the resulting coated glass flakes to room temperature.

16. A method of forming a molding compound comprising the steps of: freezing a resin which is liquid at 65° F.; pulverizing said frozen resin to produce a fine powder; mixing the powdered resin with a plurality of glass flakes; agitating the resultant mixture to coat the surfaces of said glass flakes with said powdered resin while maintaining the temperature of said resin below its freezing point; and warming said coated flakes to room temperature.

References Cited by the Examiner

UNITED STATES PATENTS

| 2,064,487 | 12/36 | Miller | 18—47 |
| 2,457,785 | 12/48 | Slayter et al. | 49—17 |
| 2,665,850 | 1/54 | Wiczer. | |
| 2,780,889 | 2/57 | Fulk | 260—37 |
| 2,863,783 | 12/58 | Greenstein | 106—193 |
| 2,875,588 | 3/59 | Berger | 18—47 |
| 2,976,574 | 3/61 | Keutgen et al. | 18—47 |
| 2,981,980 | 5/61 | Brown et al. | 18—55 |
| 3,024,701 | 3/62 | Marks et al. | |

FOREIGN PATENTS

| 824,193 | 11/59 | Great Britain. |

OTHER REFERENCES

"Epoxy Resins," Lee et al. (McGraw Hill), pages 4 and 15, 1957.